United States Patent
Grillis et al.

(10) Patent No.: US 11,392,239 B1
(45) Date of Patent: Jul. 19, 2022

(54) REMOTE INTERFACE FOR HAND-HELD SMART DEVICES

(71) Applicants: John Grillis, Lowellville, OH (US); Smolenskis Xenikis, Hubbard, OH (US)

(72) Inventors: John Grillis, Lowellville, OH (US); Smolenskis Xenikis, Hubbard, OH (US)

(*) Notice: Subject to any disclaimer, the term of this patent is extended or adjusted under 35 U.S.C. 154(b) by 134 days.

(21) Appl. No.: 16/866,738

(22) Filed: May 5, 2020

(51) Int. Cl.
*G06F 3/041* (2006.01)
*G06F 3/0488* (2022.01)
*H04M 1/02* (2006.01)

(52) U.S. Cl.
CPC .......... *G06F 3/0416* (2013.01); *G06F 3/0488* (2013.01); *H04M 1/0279* (2013.01)

(58) Field of Classification Search
CPC ............... G06F 1/1613; G06F 3/03547; G06F 3/04883; G06F 1/1626; H04B 1/3827–3888
See application file for complete search history.

(56) References Cited

U.S. PATENT DOCUMENTS

| | | | |
|---|---|---|---|
| 8,405,612 B2 | 3/2013 | Kruse et al. | |
| 9,727,082 B2 | 8/2017 | Elias | |
| 9,838,064 B2 | 12/2017 | Evans, V et al. | |
| 9,889,620 B2 | 2/2018 | Kay et al. | |
| 10,310,632 B2 | 6/2019 | Nirjon et al. | |
| 2003/0064751 A1* | 4/2003 | Charlier | H04M 1/04 455/557 |
| 2011/0007035 A1 | 1/2011 | Shai | |
| 2011/0199305 A1 | 8/2011 | Suh | |
| 2012/0075173 A1 | 3/2012 | Ashbrook et al. | |
| 2016/0098086 A1 | 4/2016 | Li | |
| 2016/0259378 A1* | 9/2016 | Oliver | G09G 5/38 |
| 2017/0083115 A1 | 3/2017 | Speck | |
| 2017/0255285 A1* | 9/2017 | Luo | G06F 3/0346 |
| 2018/0239429 A1 | 8/2018 | Gupta et al. | |

* cited by examiner

*Primary Examiner* — Sanjiv D. Patel
(74) *Attorney, Agent, or Firm* — Goldstein Law Offices, P.C.

(57) ABSTRACT

A remote interface for smart electronic hand-held devices is provided. The remote interface includes a touchpad having a sensitive surface for detecting and/or registering fingertip touch, tap, click, and gesture movements, a control module for wirelessly transmitting detected fingertip touch, tap, click, and gesture movements and generating a cursor on the hand-held device that tracks the detected fingertip touch, tap, click, and gesture movements, and a band for removably attaching the touchpad to a surface. The touchpad is rotatably coupled to a body of the remote interface and includes a bezel for rotating the touchpad about the body. An indicator indicates the directionality of the touchpad so as to provide visualization of the orientation and directionality of the touchpad relative to the graphic user interface of the hand-held device.

13 Claims, 6 Drawing Sheets

REMOTE INTERFACE FOR HAND-HELD SMART DEVICES

TECHNICAL FIELD

The present disclosure relates generally to remote interfaces. More particularly, the present disclosure relates to a remote interface for smart electronic hand-held devices including a touchpad for detecting fingertip touch, tap, and gesture movements, a control module for generating a cursor on the hand-held device that tracks detected fingertip touch, tap, and gesture movement, and a band for removably attaching the touchpad to a surface, such as the back of the hand-held device

BACKGROUND

An increasingly popular form of electronic devices is the hand-held smart electronic device. Devices of this type include smartphones, tablet computers, palm or hand-held personal computers, personal digital assistants, portable video players, and portable audio players. One specific example of such a device is the iPhone® from Apple, Inc. In this class of device, a user interacts with the graphic user interface (GUI) of the device to perform and execute tasks via finger-based touch inputs on the display screen of the device. To operate the device, a user must touch the display screen of the device directly. This is disadvantageous because having to manipulate the device directly does not allow the user to control the device remotely or simply via a different more preferential means, such as by a remote touchpad. Indeed, many individuals would prefer to manipulate the GUI of the phone using a cursor such as on a computer so as to operate the device remotely and not have to touch the display screen. Moreover, this is disadvantageous because over time, the constant and repetitive touching, scrolling, and gesturing on the display screen damages the touch sensitive capabilities of the hand-held device.

Additionally, one-handed operation of these devices is usually awkward and difficult, especially if the device is bigger or the user has smaller hands. Indeed, when operating these devices with one hand, typically only the thumb is available to manipulate the GUI, as the rest of the hand is cradling the device. Using only the thumb to operate a GUI is difficult because the thumb may not reach across the entire screen, leaving the user no other option than to awkwardly contort or bend their thumb to reach certain portions of the GUI. Thus, users must typically operate these devices with two hands. One hand to hold the phone and the other hand to manipulate the GUI. This is disadvantageous because having to use both hands to operate these devices is inconvenient and impractical in many situations. Indeed, users need a solution that provides them with the ability to operate these devices comfortably and ergonomically with one hand while leaving the other hand free to conduct other tasks if required.

Accordingly, there is a need for a remote interface for smart electronic hand-held devices that includes a touchpad for detecting fingertip, touch, tap, and gesture movements, a control module for generating a cursor on the hand-held device that tracks detected fingertip touch, tap, and gesture movement, and a band for removably attaching the touchpad to a remote surface such as the back of the smart electronic device to allow a user to operate the device comfortably with one hand.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a remote interface having a touch sensitive surface that detects finger movements. Accordingly, the present disclosure provides a remote interface including a touchpad having a tactile surface configured to detect fingertip touch, tap, and gesture movements.

An aspect of an example embodiment in the present disclosure is to provide a remote interface that enables a user to interact with the GUI of a smart electronic hand-held device remotely. Accordingly, the present disclosure provides a remote interface including a control module configured to generate a cursor on the GUI of a smart electronic hand-held device that tracks fingertip touch and gesture movements detected by the touchpad, thereby enabling a user to manipulate the GUI of the smart electronic hand-held device with the cursor to perform and execute tasks on the smart electronic hand-held device.

An aspect of an example embodiment in the present disclosure is to provide a remote interface that enables a user to manipulate the GUI of a smart electronic device with one hand and with the same portion of the hand that is cradling the device. Accordingly, the present disclosure provides a remote interface and a case, wherein the case is attachable to the back of the phone and the remote interface is attachable to the case so as to position the remote interface on the back of the smart electronic device, thereby enabling one-handed manipulation of the GUI of the smart electronic device from the rear of the device.

An aspect of an example embodiment in the present disclosure is to provide a remote interface including a fastening mechanism for removably attaching the remote interface to a surface. Accordingly, the present disclosure provides a band including a fastener that attaches the remote interface flush on a surface and orients the touchpad upwardly, thereby enabling a user to mount the remote interface to a remote surface so as to operate a smart electronic hand-held device remotely.

An aspect of an example embodiment in the present disclosure is to provide a remote interface including a touch sensitive surface that is rotatable so as to enable a user to orient the touch sensitive surface in a direction that corresponds to the directionality of the GUI of the smart electronic hand-held device. Accordingly, the present disclosure provides a remote interface including a touchpad that is rotatable about a body of the remote interface.

An aspect of an example embodiment in the present disclosure is to provide a remote interface including a means for indicating the directionality of the touch sensitive surface. Accordingly, the present disclosure provides a remote interface including an indicator showing the directionality of the touch sensitive surface.

An aspect of an example embodiment in the present disclosure is to provide a remote interface including a means for fastening the remote interface to itself around an object. Accordingly, the present disclosure provides a remote interface including a pair of straps each having a fastener configured to removably engage when positioned against each other.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
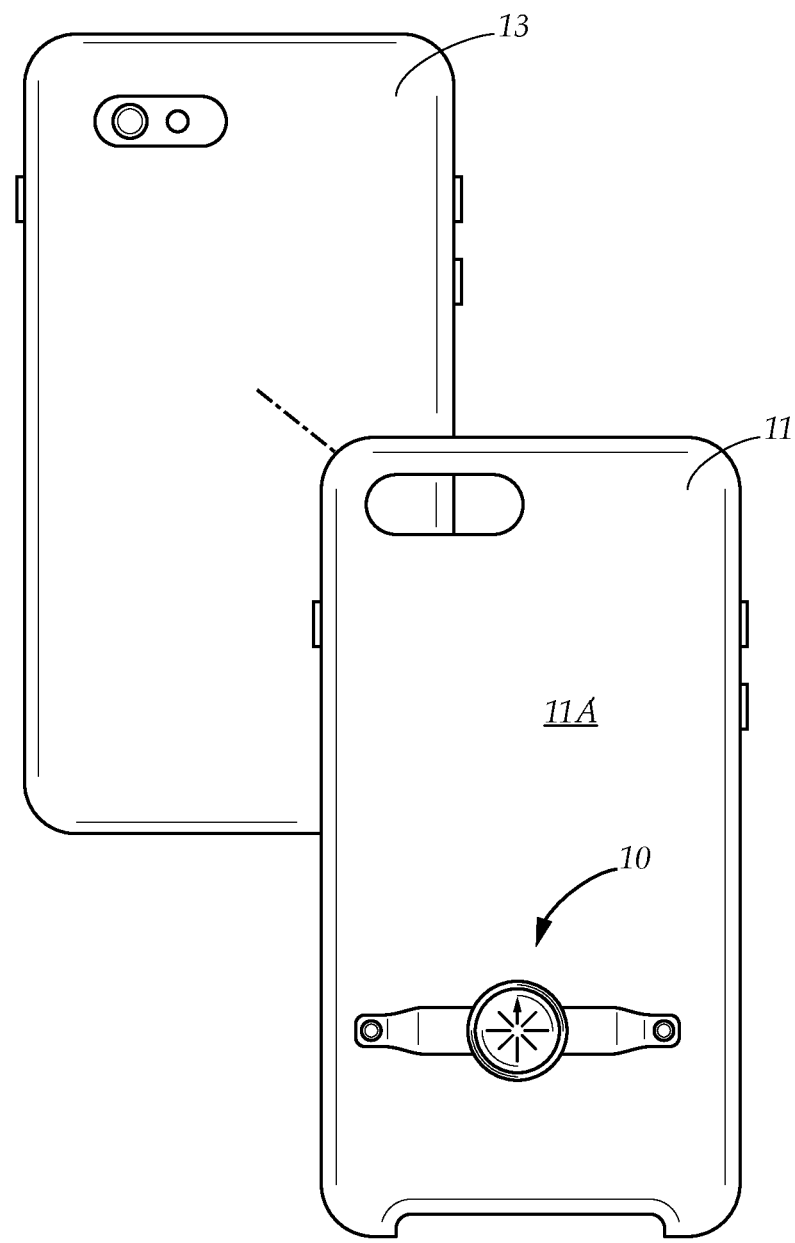
FIG. 1 is an exploded view of a remote interface removably attached to a smartphone case that is mounting onto a smartphone, illustrating how the remote interface attaches to a remote surface according to one embodiment of the present disclosure.

Referring to FIG. 1, the present disclosure provides a remote interface 10 that is configured to removably attach to a surface that is remote relative to a smart electronic hand-held device 13. For example, in embodiments, the remote interface 10 is configured to removably attach to the rear surface 11A of a case 11 of a smart electronic hand-held device 13. In some embodiments, the remote interface 10 includes the case 11 for providing a means for positioning the remote interface 10 on the back of the smart electronic hand-held device 13. The case 11 is configured to mount onto the back of the smart electronic hand-held device 13 as do smart electronic device cases known in the art.

Figure 2:
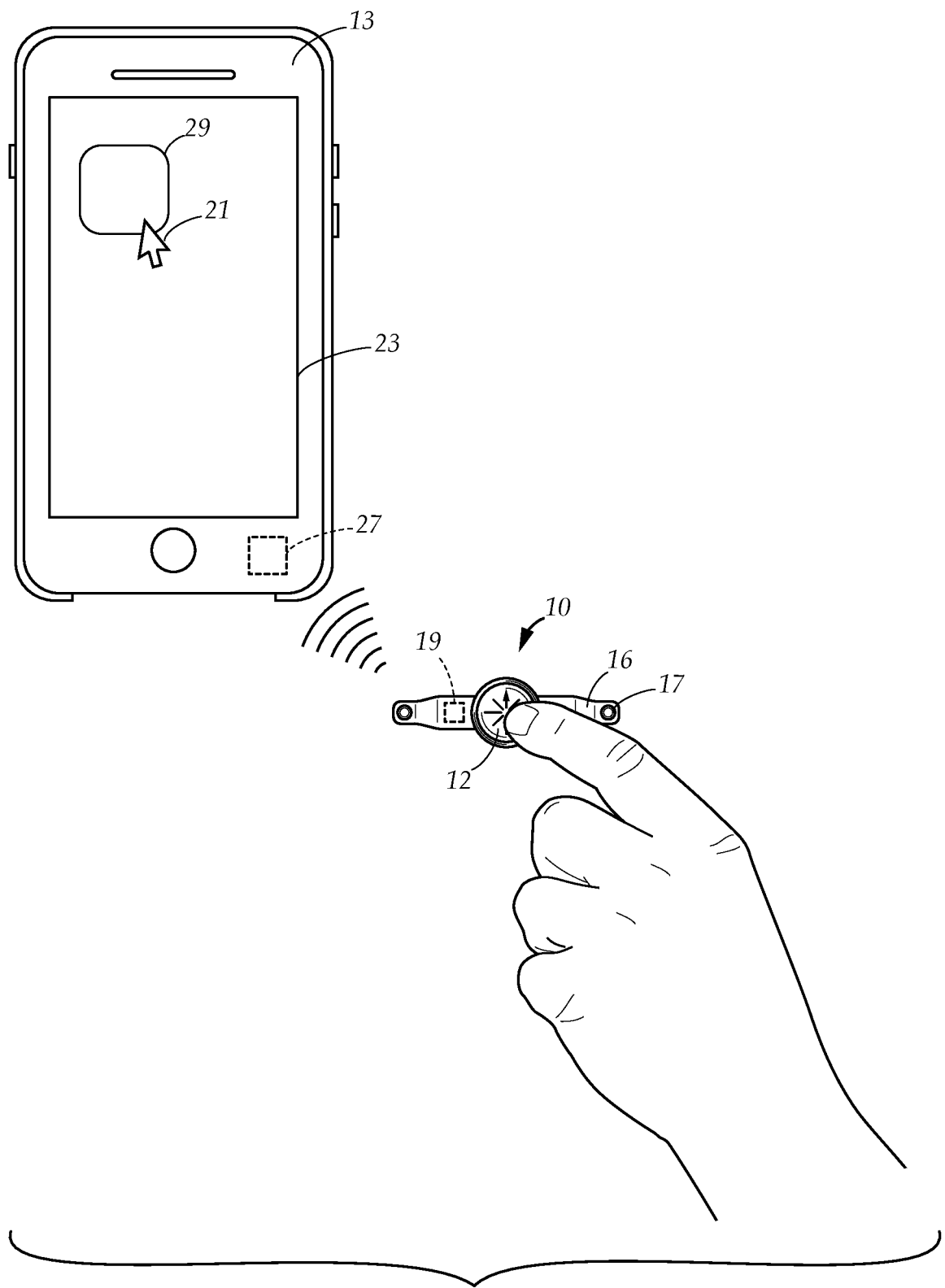
FIG. 2 is a top plan view of the remote interface being employed by a user to manipulate the GUI of a smartphone with the cursor generated by the control module of the remote interface, illustrating how fingertip motion and gestures detected by the touchpad are communicated wirelessly to the hand-held device to control the cursor and select items on the GUI according to one embodiment of the present disclosure.

Referring now to FIG. 2, the remote interface 10 includes a touchpad 12, a body 14 (not shown) a band 16, a fastener 17, and a control module 19 for remote communication with a transceiver 27 of the smart electronic hand-held device 13. The touchpad 12 includes a sensitive surface configured to detect finger touch and gesture motions or movements made on the touchpad 12 as well as register taps, clicks, and the like made on the touchpad 12. The sensitive surface comprises any known sensitive surface that detects hand or fingertip motions, movements, and pressure exerted thereon. For example, in one embodiment, the touch sensitive surface comprises a tactile surface including a tactile senor that comprises a capacitive touch sensor. In another embodiment, the tactile senor comprises a conductive touch sensor.

The control module 19 communicates wirelessly with the smart electronic hand-held device 13 via Bluetooth or any other known wireless protocols, such as Wi-Fi, WLAN, WPA, WEP, and wireless broadband. In embodiments, the control module 19 comprises a wireless transceiver 48 (not shown) that transmits a wireless signal including fingertip touch, tap, click, and gesture movement data detected by the touchpad 12 to the smart electronic hand-held device. The control module 19 generates a cursor 21 on the GUI 23 that tracks the detected fingertip touch, tap, click, and gesture movements provided in the data. In this way, a user may manipulate the GUI with the cursor 21, select items/applications 29 on the GUI, and execute functions and commands with the cursor 21 without having to touch the display screen or touchscreen of the smart electronic hand-held device 13.

Figure 6:
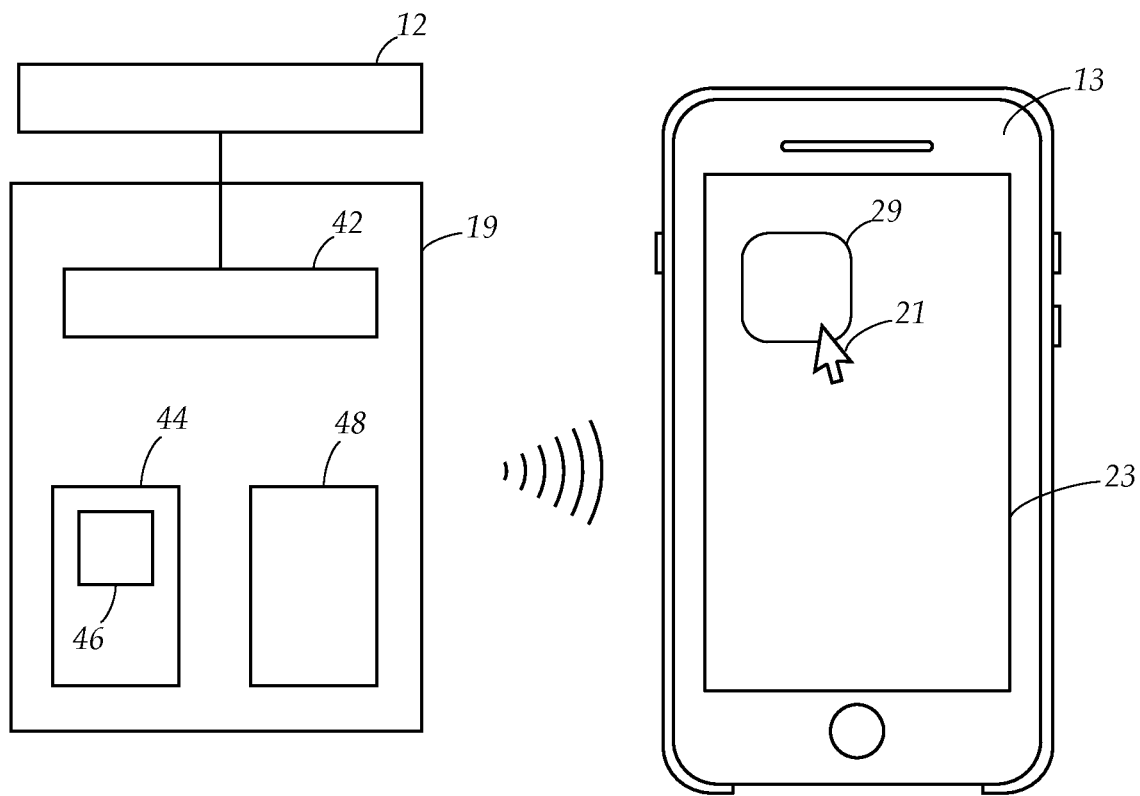
FIG. 6 shows a block diagram of the remote interface illustrating the components of the control module in communication with a smartphone according to one embodiment of the present disclosure.

Referring now to FIG. 6, in embodiments, the control module 19 comprises a processor 42 coupled to the touchpad 12, a memory 44, and a logic 46 stored on the memory 44. In operation, when the logic 46 is executed by the processor 42, the logic 46 causes the cursor 21 to be generated on the GUI 23 of the smart electronic hand-held device 13. The logic 46 causes the cursor 21 to mimic fingertip touch, tap, click, and gesture movement data detected by the touchpad 12 and transmitted by the wireless transceiver 48 on the GUI 23 of the smart electronic hand-held device 13.

Figure 3:
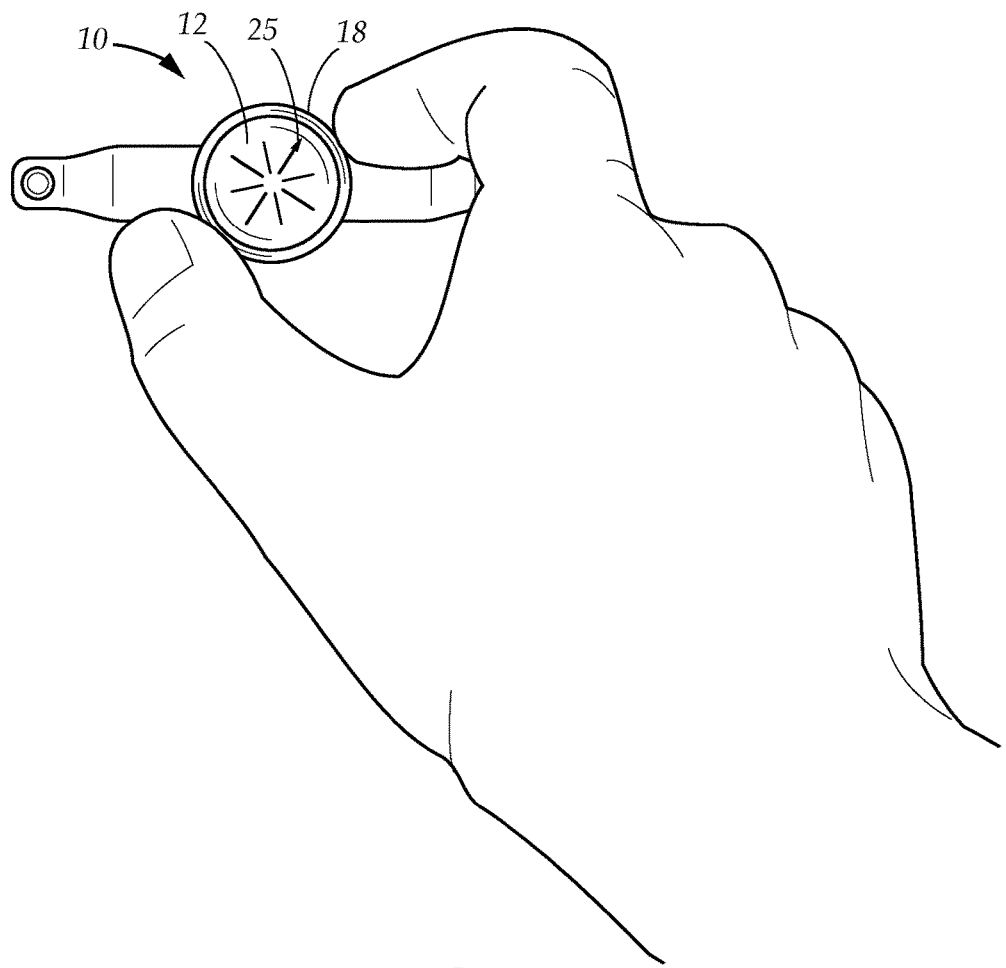
FIG. 3 is a top plan view of the remote interface being manipulated by a user illustrating how the touchpad rotates about the body according to one embodiment of the present disclosure.
Figure 3A:
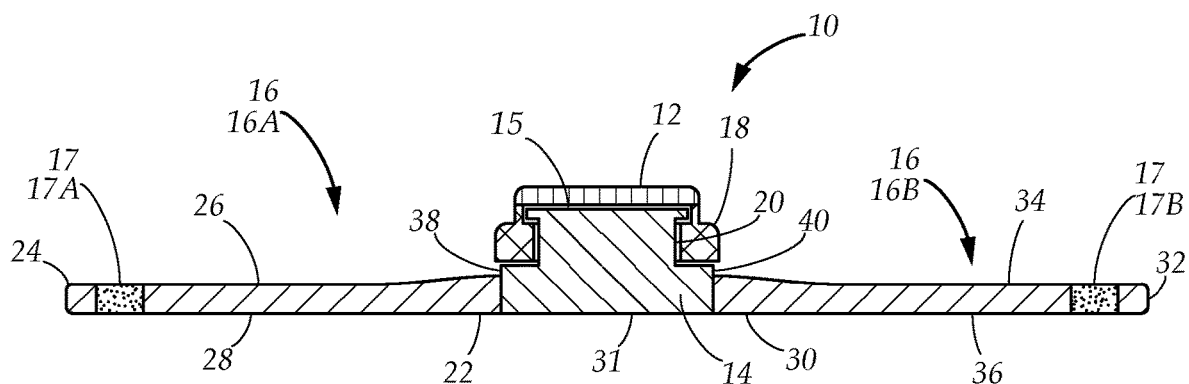
FIG. 3A is a cross-sectional view of the remote interface illustrating how the touchpad is connected to the body according to one embodiment of the present disclosure.

Referring now to FIG. 3A, the touchpad 12 is coupled to the body 14. The body 14 includes an upper end 15, a lower end 31, and a first side 38 opposing a second side 40. The touchpad 12 is rotatably mounted onto the upper end 15 of the body 14, such that the touchpad 12 may rotate axially about the body 14. In one embodiment, the touchpad 12 and the body 14 are coaxial relative to each other. In another embodiment, the touchpad 12 and the body 14 are concentrically aligned. In yet another embodiment, the touchpad 12 and body 14 are circular in shape. In one embodiment, the lower end 31 of the body 14 comprises a flat surface so that the body 14 may rest flush on a surface when the remote interface 10 is attached to the surface.

In embodiments, the remote interface 10 includes a bezel 18 affixed to a perimeter edge of the touchpad 12. The bezel 18 extends annularly around the touchpad 12 and body 14. The bezel 18 circumscribes the touchpad 12 and extends outwardly from the touchpad 12. The touchpad 12 is raised or stepped relative to the bezel 18, such that the touchpad 12 is elevated relative to the bezel 18. In this way, the bezel 18 does not interfere with use of the touchpad 12. The bezel 18 extends outwardly relative to the body 14 enabling a user to grasp and manipulate the bezel 18 to rotate the touchpad axially about the body 14. In one embodiment, the bezel 18 rotatably couples the touchpad 12 to the body 14. In this embodiment, the bezel 18 is coupled to a groove 20 annularly disposed about the body 14. The groove 20 contains the bezel 18 therein and enables rotation of the bezel 18 within the groove 20.

In embodiments, the control module comprises a calibration module configured to calibrate the orientation of the touchpad 12 in relation to the GUI of the smart electronic hand-held device. In this way, the directionality of the touchpad 12 and the directionality of the cursor in relation to the GUI correspond regardless of the orientation of the touchpad 12 about the body 14. In one embodiment, the calibration module comprises a gyroscope.

In embodiments, the band 16 comprises a first strap 16A and a second strap 16B. The first strap 16A includes a proximal end 22, a free distal end 24, a top side 26, and a bottom side 28. The second strap 16B includes a proximal end 30, a free distal end 32, a top side 34, and a bottom side 36. The proximal end 22 of the first strap 16A is attached to a first side 38 of the body 14. The proximal end 30 of the second strap 16B is attached to a second side 40 of the body 14. The first strap 16A extends outwardly from the first side 38 of the body 14. The first strap 16A is pivotally connected to the first side 38 of the body 14 such that the first strap 16A may pivot relative to the body 14. The second strap 16B extends outwardly from the second side 40 of the body. The second strap 16B is pivotally connected to the second side 40 of the body 14 such that the second strap 16B may pivot relative to the body 14. In one embodiment, the first strap 16A tapers from its proximal end 22 to its free distal end 24 and the second straps 16B tapers from its proximal end 30 to its free distal end 32.

In embodiments, the fastener 17 comprises a first fastener 17A disposed on the free distal end 24 of the first strap 16A and a second fastener 17B disposed on the free distal end 32 of the second strap 16B. The first fastener 17A faces away from the bottom side 28 of the first strap 16A and the second fastener 17B faces away from the bottom side 36 of the second strap 16B. The first and second fasteners 17A, 17B fasten to a surface when positioned against the surface. In this way, the first and second fasteners 17A, 17B position the body 14 and band 16 flush against the surface, orienting the touchpad upwardly relative to the surface for accessibility by a user. In one embodiment, the first and second fasteners 17A, 17B are circumscribed by the edges of the first and second straps 16A, 16B, respectively. In another embodiment, the first and second fasteners 17A, 17B attach to each other when the free distal end 24 of the first fastener 17A and the free distal end 32 of the second fastener 17B are positioned against each other. In embodiments, the first and second fasteners 17A, 17B comprise magnets.

Referring now to FIG. 3, in embodiments, the remote interface 10 comprises an indicator 25 coupled to the touchpad 12 and bezel 18. The indicator 25 provides a visual indication of the directionality of the touchpad 12. In other words, the indicator 25 indicates which direction on the touchpad 12 is up, down, left, and right. In this way, a user knows how to engage the touchpad 12, such that the direction of movement on the touchpad 12 corresponds with the direction of movement of the cursor on the display screen and GUI of the hand-held device. Moreover, the indicator 25 enables a user to keep track of the orientation of the touchpad 12 when the touchpad 12 is rotated about the body. In this way, a user may adjust the position of the touchpad 12 based on the indictor 25 after the remote interface 10 has been mounted onto a surface such that the directionality of the touchpad 12 corresponds to the directionality of the GUI. In some embodiments, the indicator 25 is a virtual indicator disposed on the touchpad 12 that virtually displays the upward direction of the touchpad 12. In other embodiment, the indicator 25 is indicia disposed on the sensitive surface of the touchpad 12 that shows the upwards direction of the touchpad 12. In one embodiment, the indicia is an arrow that points in the upwards direction of the touchpad 12. In another embodiment, the indicia is a compass rose indicating up, down, left, and right in place of north, south, west, and east, respectively.

Figure 4:
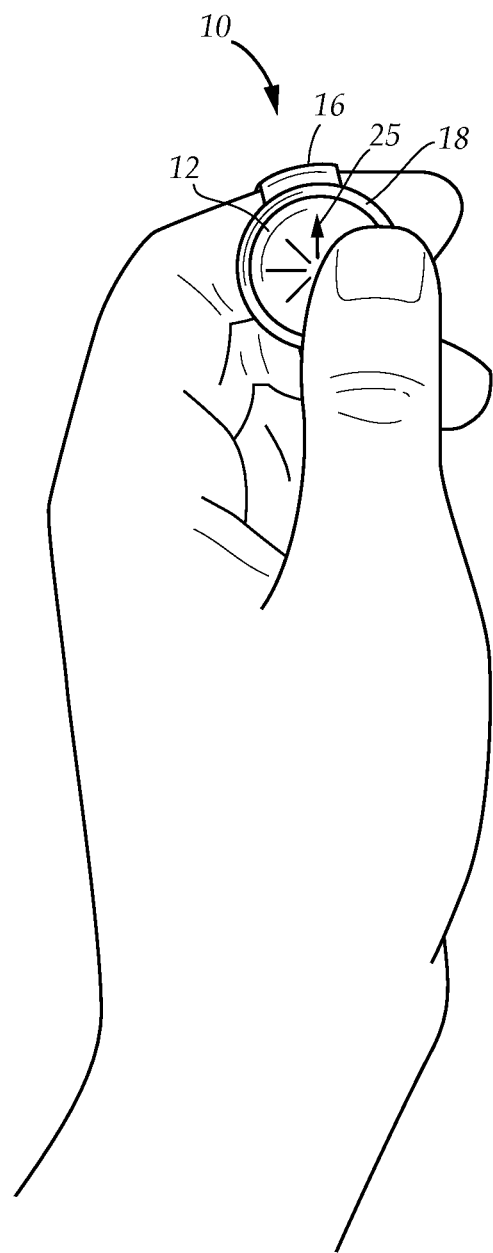
FIG. 4 is a top view of the remote interface being manipulated by a user illustrating how the remote interface is configured to fasten to a finger thereby enabling remote utilization of the touchpad by a user according to one embodiment of the present disclosure.

Referring now to FIG. 4, in one operation of the remote interface 10, a user fastens the band 16 around a finger, such as the index finger, to operate a smart electronic hand-held device remotely. Once fastened to the finger, the user may rotate the touchpad 12 by rotating the bezel 18 about the body of the remote interface 10. In this way, the user may rotate the touchpad 12 to a desired directionality of the touchpad 12. The indicator 25 shows the orientation of the touchpad 12 such that the user may keep track of the directionality of the cursor as they control the hand-held device remotely.

Figure 5:
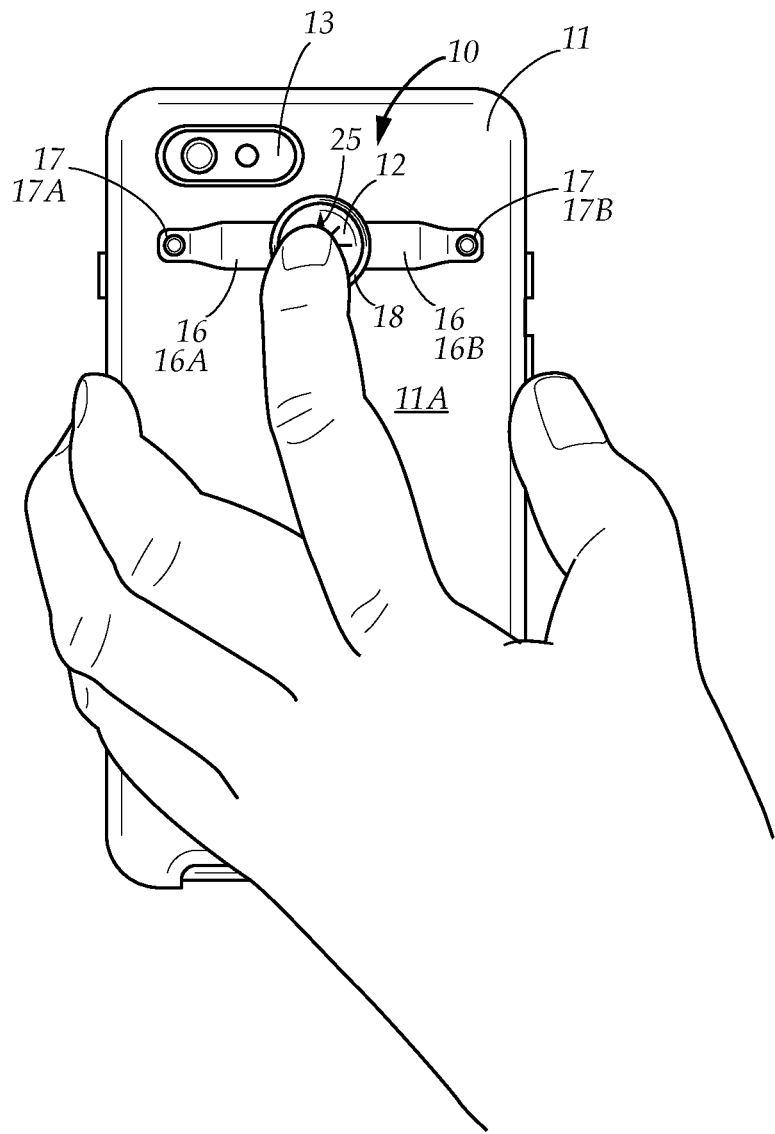
FIG. 5 shows a plan view of the remote interface removably attached to a smartphone case and being manipulated by a user, illustrating how the remote interface attaches to a remote surface and how the touchpad can be utilized once attached to the remote surface according to one embodiment of the present disclosure.

Referring now to FIG. 5, in another operation of the remote interface 10, a user fastens the straps 16A, 16B to the back of the smart electronic hand-held device 13 widthwise via the case 11, such that the straps 16A, 16B, and the body 14 (see FIG. 3A) rest flush with the surface of the case 11. The rear surface 11A of the case 11 includes a ferromagnetic material, such as metal or the like, that enables the magnets of the first and second fastener 17A, 17B to magnetically attach to any portion of the rear surface 11A of the case 11. In this way, a user may position the remote interface 10 anywhere on the rear surface 11A of the case 11 and in various orientations on the rear surface 11A of the case 11 to accommodate user preferences. The remote interface 10 includes a longitudinal length that is smaller than a width of the case 11, such that when positioned on the rear surface 11A of the case 11, the band 16 does not extend past the edges of the case 11. In other words, the rear surface 11A is larger than the span of the remote interface 10, including the band 16.

Once, the remote interface is positioned on the back of the phone via the case, the user then rotates the bezel 18 so as to move the touchpad 12 until the indicator 25 points in the same upwards directions as the GUI of the smart electronic hand-held device 13. In this way, the user may operate the smart electronic hand-held device 13 from the back without having to touch the display smart electronic hand-held device 13.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s), e.g., logic, may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a remote interface for hand-held smart devices. The disclosure is illustrated by example in the drawing figures, and throughout the written description. It should be understood that numerous variations are possible, while adhering to the inventive concept. Such variations are contemplated as being a part of the present disclosure.

What is claimed is:

1. A remote interface for smart electronic hand-held devices including a display screen having a graphic user interface, comprising:
   a body including a band having a fastener configured to selectively attach the body to the back of a smart electronic hand-held device, the body is circular in shape and includes an upper end, a lower end, and a first side opposing a second side, the band comprises a first strap and a second strap, the first strap including a proximal end, a free distal end, a top side, and a bottom side, the second strap including a proximal end, a free distal end, a top side, and a bottom side, the proximal end of the first strap is attached to the first side of the body, the proximal end of the second strap is attached to the second side of the body, the first strap extends outwardly from the first side of the body, and the second strap extends outwardly from the second side of the body;
   a touchpad rotatably coupled to the body, the touchpad is circular and substantially the same shape as the body, the touchpad including a perimeter edge, and a tactile surface configured to detect fingertip touch and gesture movement on the tactile surface;
   a bezel circumscribing the touchpad, the bezel is attached to the perimeter edge and is annularly disposed around the touchpad, the tactile surface of the touchpad is stepped relative to the bezel, and rotation of the bezel rotates the touchpad about the body;
   a control module in communication with the touchpad, the control module configured to transmit a wireless signal including detected fingertip touch and gesture movement data to the smart electronic hand-held device and generate a cursor on the graphic user interface that tracks the detected fingertip touch and gesture movement; and
   a calibration module configured to calibrate the orientation of the touchpad in relation to the display screen of the graphic user interface of the smart electronic hand-held device, such that the directionality of the touchpad and directionality of the cursor in relation to the display screen correspond regardless of the orientation of the touchpad about the body, the calibration module comprising a gyroscope.

2. The remote interface of claim 1, wherein:
   the fastener comprises a first fastener disposed on the distal end of the first strap and a second fastener disposed on the distal end of the second strap;
   the first fastener faces away from the bottom side of the first strap; the second fastener faces away from the bottom side of the second strap;
   the first fastener and the second fastener fasten to a surface when positioned against the surface, thereby positioning the body and band flush against the surface and orienting the touchpad upwardly relative to the surface for accessibility by a user;
   the first fastener comprises a first magnet; and
   the second fastener comprises a second magnet.

3. The remote interface of claim 2, further comprising a smart electronic hand-held device case configured to removably attach to the back of the smart electronic hand-held device, the case including a rear surface having ferromagnetic properties to magnetically receive the first magnet and second magnet to position the remote interface on the back of the smart electronic hand-held device.

4. The remote interface of claim 3, wherein a width of the rear surface of the smart electronic device is larger than a longitudinal length of the body of the remote interface, such that the band of the remote interface includes a length smaller than the width of the rear surface.

5. The remote interface of claim 3, wherein the first fastener and the second fastener attach to each other when the distal end of the first fastener and the distal end of the second fastener are positioned against each other.

6. The remote interface of claim 5, wherein:

the first strap tapers from its proximal end to its distal end; and the second strap tapers from its proximal end to its distal end.

7. The remote interface of claim 3, comprises an indicator configured to indicate the directionality of the touchpad.

8. The remote interface of claim 7, wherein the indicator is a virtual indicator disposed on the touchpad that virtually displays the upward direction of the touchpad.

9. The remote interface of claim 7, wherein the indicator is an arrow marked on the tactile surface of the touchpad that points towards the upwards direction of the touchpad.

10. The remote interface of claim 7, wherein the tactile surface comprises a tactile sensor selected from the group consisting of a capacitive touch sensor and a conductive touch sensor.

11. The remote interface of claim 1, wherein the control module comprises a wireless transceiver configured to transmit the wireless signal including the detected fingertip touch and gesture movement data to the smart electronic hand-held device.

12. The remote interface of claim 11, wherein the control module further comprises:

a processor;

a memory; and a logic stored on the memory that is executable by the processor, wherein when the logic is executed by the processor, the logic causes the cursor to be generated on the graphic user interface of the smart electronic hand-held device.

13. The remote interface of claim 12, wherein the logic causes the cursor to mimic the detected fingertip touch and gesture movement data transmitted by the wireless transceiver on the graphic user interface of the smart electronic hand-held device.

* * * * *